US010069354B2

(12) United States Patent
Mili

(10) Patent No.: US 10,069,354 B2
(45) Date of Patent: Sep. 4, 2018

(54) MAGNET-RETAINING SPRING, ELECTRIC MACHINE CONTAINING SUCH A MAGNET-RETAINING SPRING, AND METHOD FOR PRODUCING THE ELECTRIC MACHINE

(71) Applicant: Robert Bosch GmbH, Stuttgart (DE)

(72) Inventor: Tarek Mili, Lauterbourg (FR)

(73) Assignee: Robert Bosch GmbH, Stuttgart (DE)

( * ) Notice: Subject to any disclaimer, the term of this patent is extended or adjusted under 35 U.S.C. 154(b) by 302 days.

(21) Appl. No.: 14/779,100

(22) PCT Filed: Mar. 6, 2014

(86) PCT No.: PCT/EP2014/054321
§ 371 (c)(1),
(2) Date: Sep. 22, 2015

(87) PCT Pub. No.: WO2014/154460
PCT Pub. Date: Oct. 2, 2014

(65) Prior Publication Data
US 2016/0049834 A1 Feb. 18, 2016

(30) Foreign Application Priority Data

Mar. 28, 2013 (DE) .................. 10 2013 205 652

(51) Int. Cl.
*H02K 1/17* (2006.01)
*H02K 23/04* (2006.01)
(Continued)

(52) U.S. Cl.
CPC .............. *H02K 1/185* (2013.01); *H02K 1/17* (2013.01); *H02K 15/03* (2013.01); *H02K 23/04* (2013.01)

(58) Field of Classification Search
CPC ........ H02K 1/17; H02K 15/03; H02K 1/2786; H02K 1/27; H02K 23/04; H02K 21/26;
(Continued)

(56) References Cited

U.S. PATENT DOCUMENTS 3,165,654 A * 1/1965 Mabuchi .................. H02K 1/17
310/154.14
4,012,651 A * 3/1977 Burson ................ H02K 1/2786
310/153
(Continued)

FOREIGN PATENT DOCUMENTS

DE 19942029 A1 * 3/2001 ............. H02K 1/278
DE 102004057199 6/2005
(Continued)

OTHER PUBLICATIONS

DE 19942029 A1 (English Translation).*
(Continued)

*Primary Examiner* — Terrance Kenerly
*Assistant Examiner* — Alexander Moraza
(74) *Attorney, Agent, or Firm* — Michael Best & Friedrich LLP

(57) ABSTRACT

The invention relates to a magnet-retaining spring (11), to an electric machine (10) containing such a magnet-retaining spring, and to a method for producing the electric machine (10), in particular for the motorized adjustment of moving parts in a motor vehicle, wherein the magnet-retaining spring (11) has a first leg (90) and a second leg (91), which are connected to each other by means of a bow (92), and the first and second legs (91, 92) span a plane (88) in space, wherein the bow (92) protrudes from the spanned plane (88).

23 Claims, 4 Drawing Sheets

(51) Int. Cl.
*H02K 1/18* (2006.01)
*H02K 15/03* (2006.01)

(58) Field of Classification Search
CPC ........ H02K 21/28; H02K 21/30; H02K 21/36; H02K 37/10
USPC ............ 310/154.14, 154.15, 154.03, 154.05, 310/154.08, 154.09, 156.16, 156.17, 310/156.24, 49.28, 49.46, 216.131, 152
See application file for complete search history.

(56) References Cited

U.S. PATENT DOCUMENTS

| | | | | |
|---|---|---|---|---|
| 4,372,035 | A | * | 2/1983 | McMillen ................ H02K 1/17 29/596 |
| 4,636,107 | A | * | 1/1987 | Casler ..................... F16B 2/243 267/164 |
| 4,668,887 | A | * | 5/1987 | D'Argouges ........... H02K 1/17 310/154.14 |
| 5,933,582 | A | | 8/1999 | Yamada |
| 5,959,386 | A | * | 9/1999 | Knight .................... H02K 1/17 310/154.14 |
| 2005/0116568 | A1 | * | 6/2005 | Suga ....................... H02K 1/17 310/154.14 |
| 2010/0013337 | A1 | * | 1/2010 | Qin ......................... H02K 1/17 310/154.21 |
| 2015/0130329 | A1 | * | 5/2015 | Kawashima ........... H02K 23/32 310/68 C |

FOREIGN PATENT DOCUMENTS

| | | | |
|---|---|---|---|
| DE | 102007004873 | | 8/2008 |
| DE | 102009033623 | | 1/2010 |
| DE | 202012012483 | | 3/2013 |
| EP | 0334662 | | 9/1989 |
| FR | 1559701 A | | 3/1969 |
| FR | 2700077 A1 | * 7/1994 | ............... H02K 1/17 |
| JP | 52095008 U | * 7/1977 | |
| JP | H10174318 A | | 6/1998 |
| JP | 2002010536 A | | 1/2002 |
| KR | 20070116445 A | * 12/2007 | |
| WO | 2008092523 | | 8/2008 |

OTHER PUBLICATIONS

KR 20070116445 A (English Translation).*
JP 52095008 U (English Translation).*
FR 2700077 A1 (English Translation).*
International Search Report for Application No. PCT/EP2014/054321 dated May 19, 2015 (English Translation, 3 pages).
European Office Action from the European Patent Office for Application No. 14708044.4 dated May 23, 2018 (8 pages).

* cited by examiner

MAGNET-RETAINING SPRING, ELECTRIC MACHINE CONTAINING SUCH A MAGNET-RETAINING SPRING, AND METHOD FOR PRODUCING THE ELECTRIC MACHINE

BACKGROUND OF THE INVENTION

The invention proceeds from a magnet-retaining spring, and also an electrical machine containing a magnet-retaining spring of this kind, and also a method for producing the electrical machine.

U.S. Pat. No. 4,372,035 has disclosed an electric motor in which two permanent magnets which are situated opposite one another and two so-called consequent poles between said two permanent magnets are arranged in a pole housing. In order to form the consequent poles, a contour is formed in the pole housing wall, the arcuate inner face of said contour being at the same distance from the rotor as the shell-like permanent magnets. Magnet-retaining springs which press the permanent magnets against the housing wall by means of a spring force in order to fasten said permanent magnets are known for fastening permanent magnets in the pole housing. DE 102007004873 A1 describes, for example, a magnet-retaining spring of this kind, in which shafts are formed on the two longitudinal limbs in order to stabilize said magnet-retaining spring. The clip between the two longitudinal limbs is of planar design and is arranged in the same plane as the two limbs. If a magnet-retaining spring of this kind is intended to be used for the above-described consequent pole motor, there is a risk of the magnet-retaining spring tilting radially inwardly toward the rotor in the region of the consequent pole contour and touching said rotor. This can lead to destruction of the electric motor.

SUMMARY OF THE INVENTION

In contrast to the above, the magnet-retaining spring according to the invention and the electrical machine containing a magnet-retaining spring of this kind, and the method according to the invention for producing a machine of this kind, have the advantage that the design of the magnet-retaining spring, in particular the clip of said magnet-retaining spring, prevents the magnet-retaining spring from tilting radially inward. This is achieved by the clip not being arranged in the same plane which is formed by the two approximately straight limbs. The clip has at least spatial components which are formed transversely in relation to this plane. Owing to this three-dimensional design of the magnet-retaining spring, the limbs bear securely against the permanent magnets without there being a risk of the magnet-retaining spring touching the rotor.

It is particularly advantageous when the connecting region between the two limbs is bent. In the assembled state, this connecting region then runs—at least partially—in the manner of an arc through the interior space in the housing starting from the two straight limbs of the housing wall which bear against the permanent magnet. In a preferred embodiment, the clip has, in particular, no straight sections in this case, but rather is curved over its entire longitudinal extent—wherein the bending radius is preferably variable over the longitudinal extent.

The clip which connects the two approximately straight limbs to one another can also have a straight section which then runs preferably approximately parallel to the plane which is spanned by the two limbs, wherein the straight section is at a certain distance from this plane. In this case, the clip also has two further transition sections which then lead from the straight section to the two limbs in a more or less bent manner.

If the direction of extent of the clip is broken down (in the mathematical sense) over its entire longitudinal extent into in each case two components which extend in the plane which is spanned by the limbs and a direction perpendicular to said plane, the clip always has at least one section in which the directional component perpendicular to the plane of the limb is different from zero.

The magnet-retaining spring is produced in a particularly cost-effective manner from a metal wire as a wire bent part in which an integral wire with a round or polygonal cross section is bent into a three-dimensional structure. Owing to the use of spring steel, the magnet-retaining spring is elastically deformed when it is installed, so that said magnet-retaining spring exerts a spring force on the permanent magnets.

The magnet-retaining spring is preferably manufactured such that the two limbs form an angle in relation to one another before installation, said angle being, for example, 10° to 35°. During installation, the magnet-retaining spring is then deformed such that the two limbs run approximately in parallel. Since the limbs are straight, the deformation during installation takes place in the region of the clip or in the transition regions from the clip to the limbs.

In order to fix the permanent magnets and the pole housing of the electrical machine in a particularly simple manner, said permanent magnets are pressed against the inner wall by means of magnet-retaining springs. In the process, the free ends of the U-shaped spring bear against side faces, which point in the circumferential direction, of the permanent magnets. Owing to the clamping force which is exerted by means of the magnet-retaining spring between the two permanent magnets, said permanent magnets are fixed in the housing both radially and, in particular, also axially. For improved contact of the free limbs against the side faces, the limbs or the side faces can have a structured surface. The permanent magnets can have—in particular continuous—pole lifting or two different discrete inside radii, as a result of which the side face is at a greater distance from the rotor. The side face is formed radially or obliquely to the radial direction and preferably has a sensor on the outer circumference. It is possible to use, for example, ferrite material for the magnets, or as an alternative also rare-earth magnet materials.

The consequent poles are preferably expediently realized by integrally forming in each case two beads, which run in the axial direction, in the pole housing wall. As a result, a curved inner contour which interacts with the rotor in a magnetic manner is formed in the circumferential direction. These beads form the edges of the consequent pole in relation to the circumferential direction and at the same time form the boundary for the retaining region of the permanent magnets. Since the consequent poles and the permanent magnets have approximately the same inside diameter, the limbs are arranged between the beads and the side faces of the magnets.

To this end, a hollow space or gap into which the free limbs engage over the entire axial length is formed between the beads of the consequent pole contour and the side faces of the permanent magnets. In this case, the limbs firstly bear against the side face of the magnet in the circumferential direction and on the opposite side against the lateral inner face of the bead for the purpose of defined positioning. The clip, which connects the two straight limbs, then has radial components which engage over the two edge-side beads of the consequent pole by the clip extending radially inward from the beads.

The housing is advantageously in the form of a pole pot which has a base—which is preferably integrally formed with the pole pot—on one side, said base having, in particular, a bearing receptacle for a rotor bearing. The opposite open pole pot side has a flange which, after assembly, bears against a corresponding mating flange of a further housing part. In order to prevent the radially inwardly projecting clip colliding with the rotor, the clip is arranged axially between the rotor and the housing base, wherein said clip bears axially against the housing base, in particular for the purpose of unambiguous positioning.

A receptacle region is formed on the pole housing immediately adjacent to the flange. Said receptacle region can advantageously receive a brush holder component which extends axially over the interface of the flange into the adjacent housing part. By way of example, holes are formed on the flange as receptacles for connecting elements—preferably screws or rivets—to a gear mechanism housing.

Owing to the production method according to the invention for the pole housing, the consequent pole region with the beads, the retaining region for the magnets and the receptacle region with the flange are formed in a cost-effective and precise manner by means of deep-drawing in one working step. In the process, the design of the specific dimensions of particular components and the wall thickness with minimum material usage can be realized by the selection of the deep-drawing tool. The three-dimensional retaining spring can be used after the insertion of the magnets in accordance with the standard mounting process for customary magnet-retaining springs, wherein the limbs can advantageously be positioned exactly in a simple manner by contact with the side faces of the magnets and with the lateral inner faces of the consequent poles. In the process, the clip of the magnet-retaining spring runs against the housing base radially within the plane between the two limbs, without the clip bearing axially against the rotor. The axial mounting of the rotor and of the brush holder component into the pole housing permits an unambiguously predefinable flange interface which is particularly expediently suitable for a modular construction kit for combining different pole housings and gear mechanism housings.

The spring-retaining element can optionally also be used in combination with adhesive bonding of the permanent magnets in order to reliably fix said permanent magnets during the adhesive bonding process.

BRIEF DESCRIPTION OF THE DRAWINGS

Embodiments of the invention are illustrated in the drawings and explained in greater detail in the following description.

In the drawings

DETAILED DESCRIPTION

Figure 1:
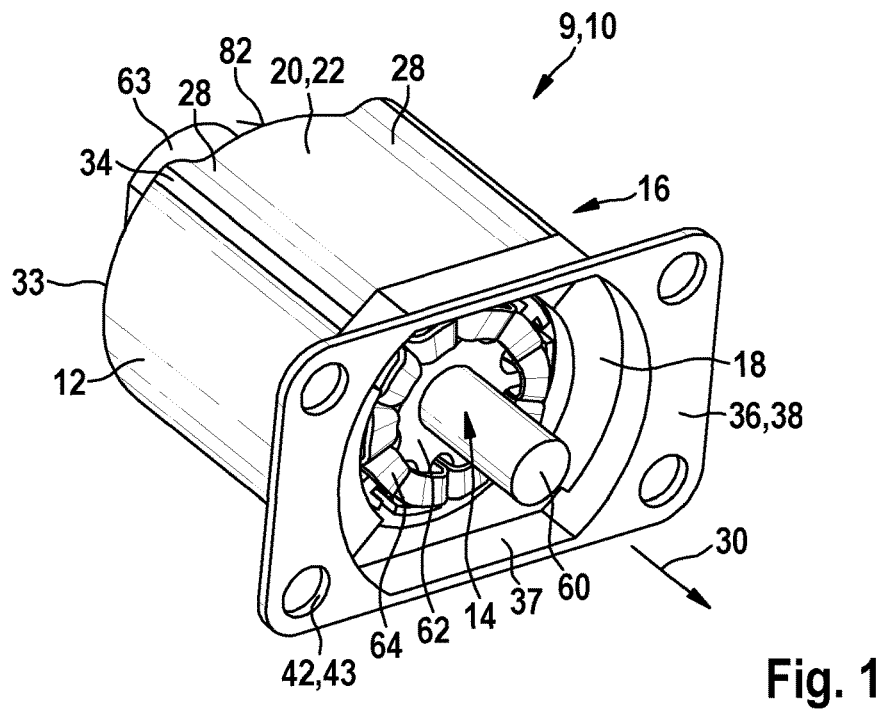
FIG. 1: shows an exemplary embodiment of an electrical machine according to the invention.

FIG. 1 shows an electrical machine 10 according to the invention which is in the form of an electric motor 11. The electric motor 11 is, for example, a constituent part of a gear mechanism/drive unit 100, as is used for adjusting a sliding roof, a window or a seat part in motor vehicles. The electrical machine 10 has a stator 12 in which two permanent magnets 18 are arranged opposite one another in a housing 16 which is in the form of a pole housing 16. Two consequent poles 22 which are situated opposite one another and are formed by the housing wall 26 of the pole housing 16 are arranged between the two permanent magnets 18 which are situated opposite one another. To this end, in each case two beads 28, which extend in the axial direction 30—preferably as far as a housing base 82 of the housing 16—are formed in flattened regions 20 of the pole housing 16. The consequent pole 22 is in the form of a curved pole housing wall 26 between the two beads 28 in the circumferential direction 32, said housing wall forming, together with the beads 28 and a lateral retaining region 34 for the permanent magnets 18, the flattened region 20 of the pole housing 16. The pole housing 16 has an axially open side 36 on which a flange 38 for connection to a further housing part 40 is formed. The flange 38 has receptacles 42 for connecting elements which are in the form of, for example, bores 43. Screws can preferably be screwed into a corresponding mating flange 44 as connecting elements through said bores 43. A rotor 14 is inserted into the stator 12 in FIG. 1, wherein a small radial air gap 46 to the permanent magnets 18 and consequent poles 22 which surround the rotor 14 is formed.

Figure 2:
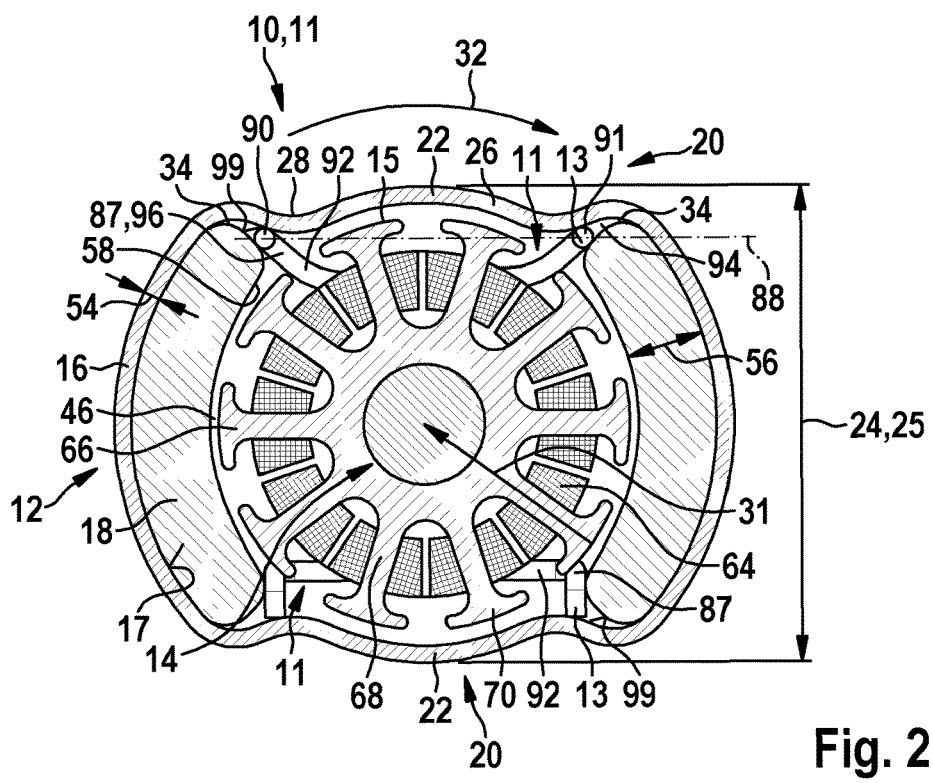
FIG. 2: shows a cross section through FIG. 1, FIG. 3: shows an exemplary embodiment of a magnet-retaining spring according to the invention.

FIG. 2 shows a section through the stator 12 and the rotor 14 of FIG. 1 transverse to the axial direction 30. The permanent magnets 18 bear against the inner wall 17 of the pole housing 16 and are fixed in the pole housing 16 by means of magnet-retaining springs 11. The two permanent magnets 18 are magnetized in the same sense in the radial direction 31, and therefore the two permanent magnets form a south pole, for example, on their radially inner face. A magnetic circuit to the consequent poles 22 is produced by means of the pole housing 16 which forms a magnetic return path, said consequent poles then each forming a north pole, for example, on the inner wall 17 of the pole housing 16. Since no permanent magnets 18 are arranged in the region of the consequent poles 22, the maximum dimension 25 of the pole housing 16 between the flattened regions 20 is considerably lower than in the direction of the two permanent magnets 18. The maximum dimension 25 represents a width 24 over flats for the available installation space which is matched in an optimum manner to the corresponding application, in particular to the installation position in the motor vehicle. In FIG. 2, the maximum radial dimension 25 is formed at the curved regions of the consequent poles 22 between the beads 28 in the circumferential direction 32. The wall thickness 54 of the pole housing 16 is optimized in relation to weight, magnetic flux and noise minimization. Since the pole housing 16 is produced as a deep-drawn part, the wall thickness 54 is relatively constant over the entire circumference. The permanent magnets 18 have so-called pole lifting 58, so that the air gap 46 between the rotor 14 and the permanent magnet 18 widens in the circumferential direction 32. The rotor 14 has a rotor shaft 60 on which an armature stack 62 for receiving electrical windings 64 is arranged. To this end, the armature stack 64 has rotor teeth 66 which are formed from radial tooth shafts 68 which are terminated by radially outer tooth heads 70. The electrical windings 64 are wound onto the tooth shafts 68 radially within the tooth heads 70. The permanent magnets 18 have side faces 99 in the circumferential direction 32, two free limbs 90, 91 of the magnet-retaining spring 11 bearing against said side faces. The free limbs 90, 91 are connected to one another at their ends which are not free by means of a clip 92, so that the magnet-retaining spring 11 between the permanent magnets 18 generates a contact-pressure force which acts transverse to the axial direction 30. The clip 92 projects out of a plane 88 which is spanned by the two limbs 90, 91 and is formed radially into the housing interior in the direction of the rotor shaft 60. In the upper half of the figure, the magnet-retaining spring 11 has a round cross section 13, and the clip 92 is curved or in the form of an arc. In this case, the clip 92 has a radial component 96 in the transition sections 87 to the limbs 90, 91, said radial component pointing radially away from the beads 28, so that the clip 92 runs through the interior of the housing 16 and overlaps the rotor 14. In this case, the clip 92 runs axially between the rotor 14 and the housing base 82. In the lower half of FIG. 2, the magnet-retaining spring 11 has a polygonal, in particular rectangular or square, cross section 13. In this case, the clip 92 is formed in an approximately polygonal manner transverse to the axial direction 30, so that the clip 92 has a straight section 84 which is arranged approximately parallel to the plane 88. In this case, the transition sections 87 point approximately perpendicularly away from the plane 88.

Figure 3:
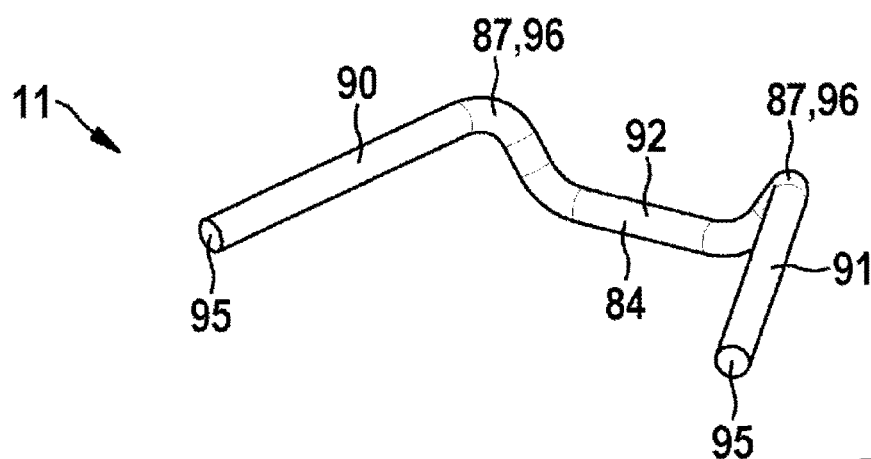

FIG. 3 shows a magnet-retaining spring 11 according to the invention before it is installed into the electrical machine 10. The two limbs 90, 91 are straight and have free ends 95. The limbs 90, 91 are connected to one another by means of the clip 92 at the ends which are situated opposite one another. The two limbs 90, 91 form a plane 88, wherein the clip 92 is arranged outside this plane 88. As a result, the magnet-retaining spring 11 is three-dimensional. In this case, the clip 92 has a straight section 84 which runs approximately parallel to the plane 88. The transition sections 87 in the direction of the limbs 90, 91 are bent. In this exemplary embodiment, the limbs 90, 91 are arranged at an angle in relation to one another within the plane 88, said angle being, for example, approximately 30°. When it is installed into the housing 16—as is illustrated in FIG. 5—the magnet-retaining spring 11 is elastically reshaped, so that the limbs 90, 91 then bear against the side faces 99 and are oriented approximately parallel in relation to one another.

Figure 4:
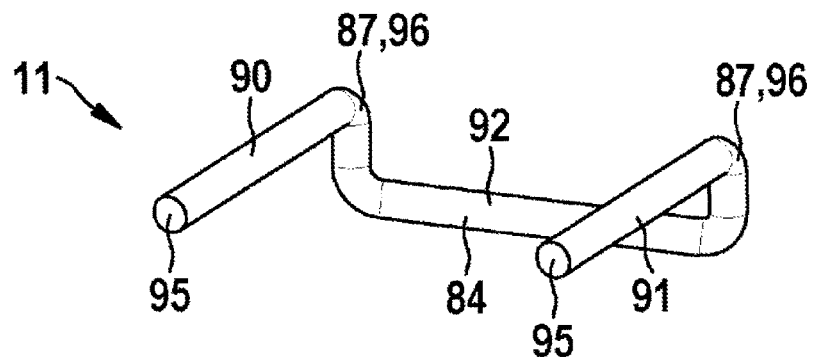
FIG. 4: shows a further exemplary embodiment of a magnet-retaining spring according to the invention.

FIG. 4 shows a further exemplary embodiment of a magnet-retaining spring 11 according to the invention, in which the two limbs 90, 91 are oriented approximately parallel in relation to one another after installation. The clip 92 again projects out of the plane 88, wherein the clip 92—in accordance with the lower half of FIG. 2—is polygonal transverse to the plane 88. The straight section 84 of the clip 92 is at a distance 72 from the plane 88, said distance always being greater than the inwardly directed height of the bead 28. During installation, the transition sections 87 in particular are elastically deformed in this embodiment, so that the two limbs 90, 91 are pressed apart transverse to the axial direction 30, as is illustrated in FIG. 6.

Figure 5:
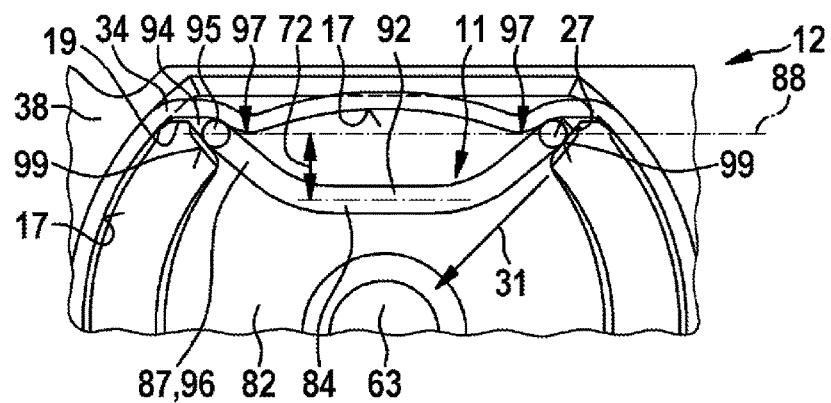
FIG. 5: shows the magnet-retaining spring according to FIG. 3 in the state in which it is installed in the housing.

FIG. 5 shows a plan view of the open side 36 of the stator 12, in which the permanent magnets 18 are retained in the pole housing 16 by means of magnet-retaining springs 11 according to FIG. 3. The magnet-retaining spring 11 has two free limbs 90, 91 which are situated opposite one another and which are connected to one another by means of the clip 92. The free limbs 90, 91 bear against the permanent magnets 18 which are situated opposite one another and press said permanent magnets against the inner wall 17 of the pole housing 16 in order to fix said permanent magnets.

A hollow space 94 into which the limbs 90, 91 project is formed between the side face 99 of the permanent magnet 18, which side face points in the circumferential direction 32, and an opposite lateral face 27 of the bead 28. In this case, the free ends 95 of the limbs 90, 91 preferably bear both against the side face 99 and also against the lateral face 27 of the bead 28. In this case, the hollow space 94 in particular is in the form of a wedge in the radial direction 31. In this exemplary embodiment, the contact face of the limbs 90, 91 on the permanent magnets 18 lies within the radially inner half of the radial wall thickness 56 of the permanent magnets 18. The cross section 13 of the limbs 90, 91 is, for example, round, but may also be semicircular, flattened or be in the form of a flat profile or polygonal profile, and/or also have a structured surface which adheres better to the side face 99. A structure, for example a notch in the axial direction 30, can likewise be formed on the side face 99, the limbs 90, 91 engaging into said structure. In this case, the contour of the side face 99 can be correspondingly adapted, for example entirely or partially form an angle in relation to the radial direction 31. Furthermore, the outer or inner magnet edge of the permanent magnet 18 can be correspondingly beveled or have a chamfer 19. The two adjacent beads 28 each form inner edges 97 which are bridged by the clip 92 which connects the two limbs 90, 91 beyond the inner edges 97. This prevents the magnet-retaining spring 11 tilting radially inward out of the axial direction 30 at the inner edge 97 of the bead 28 which would form a tilting point for a conventional magnet-retaining spring. To this end, the clip 92 has radial components 96 which lead through the interior of the housing 16 radially away from the inner edges 97. In FIG. 5, the clip 92 bears axially against the inner side of the housing base 82 which then forms an axial stop for the magnet-retaining spring 11. Two magnet-retaining springs 11 are clamped (not illustrated) between the two permanent magnets 18, the limbs 90, 91 of said magnet-retaining springs lying approximately in a plane 88 with the flattened regions 20 of the pole housing 16.

Figure 6:
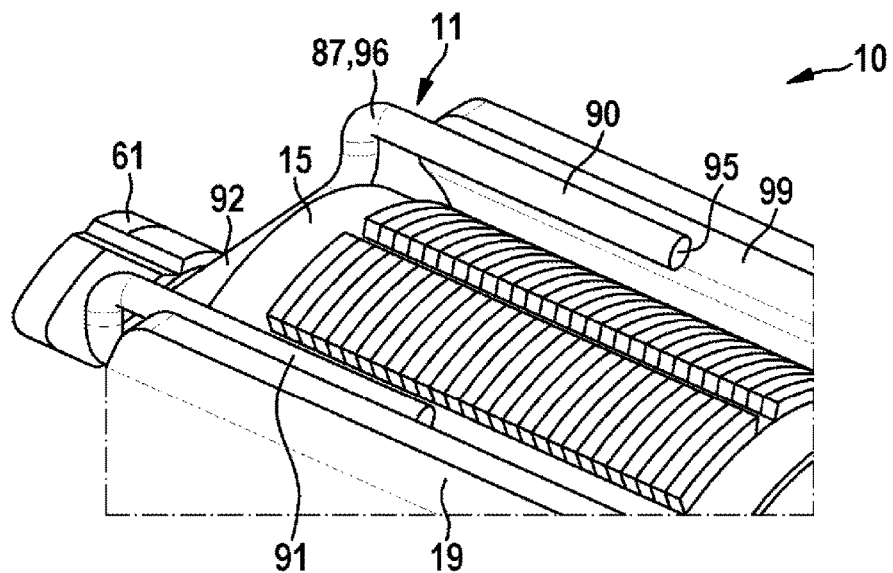
FIG. 6: shows a schematic installed arrangement of the magnet-retaining spring according to FIG. 4, and FIG. 7: shows the mounting concept according to the invention for the gear mechanism/drive unit.

FIG. 6 schematically illustrates the magnet-retaining spring 11 according to FIG. 4 in the installed state without the housing. The clip 92, which again has a straight section 84 here, is arranged axially between the rotor 14 and the housing base 82, not illustrated. In this case, the clip 92 overlaps the rotor 14, so that the clip 92 is arranged radially within the circumferential face 15 of the rotor 14. A rotor bearing 61 is arranged on the rotor shaft 60, said rotor bearing being inserted into a bearing receptacle 63 in the housing base 82. The limbs 90, 91 preferably extend over at least half of the axial extent of the permanent magnets 18, as a result of which said permanent magnets are pressed reliably against the housing 16 over their entire axial extent.

During the production process for the electrical machine 10, the pole housing 16 is manufactured as a pole pot with the flange 38 and with the receptacle region 37 as a defined interface by means of deep-drawing, wherein the beads 28 are also integrally formed in one working step. The permanent magnets 18 are then inserted into the pole housing 16, wherein said permanent magnets can optionally be adhesively bonded to the inner wall 17 of said pole housing. In order to fix the permanent magnets 18, two magnet-retaining springs 11 are inserted into the pole housing 16 in such a way that the limbs 90, 91 bear against the side faces 99 of the permanent magnets 18 and press said permanent magnets against the inner wall 17 of the pole housing 16. In this case, the clip 92 is arranged at a distance from the plane 88 of the two limbs 90, 91 radially within said plane, so that the magnet-retaining springs 11 do not touch the inner edges 97 of the beads 28. After the permanent magnets 18 are fixed, the rotor 14 and a brush carrier component 86 are inserted axially into the pole housing 16, so that the brush carrier component 86 is arranged in the receptacle region 37 and projects axially beyond the flange 38. A further housing part 40 which is in the form of a gear mechanism housing 101 is then mounted onto the brush carrier component 86 axially over the rotor shaft 60, until the flange 38 bears against the mating flange 44 of the housing part 40. Connecting elements—preferably screws—are then inserted into the receptacles 42 in the flange 38 and connected to the housing part 40. This mounting method is shown in FIG. 7 in which the rotor shaft 60 has a worm 106 and is mounted in the brush holder component 86 by means of a sliding bearing 118—in particular a spherical bearing.

Figure 7:
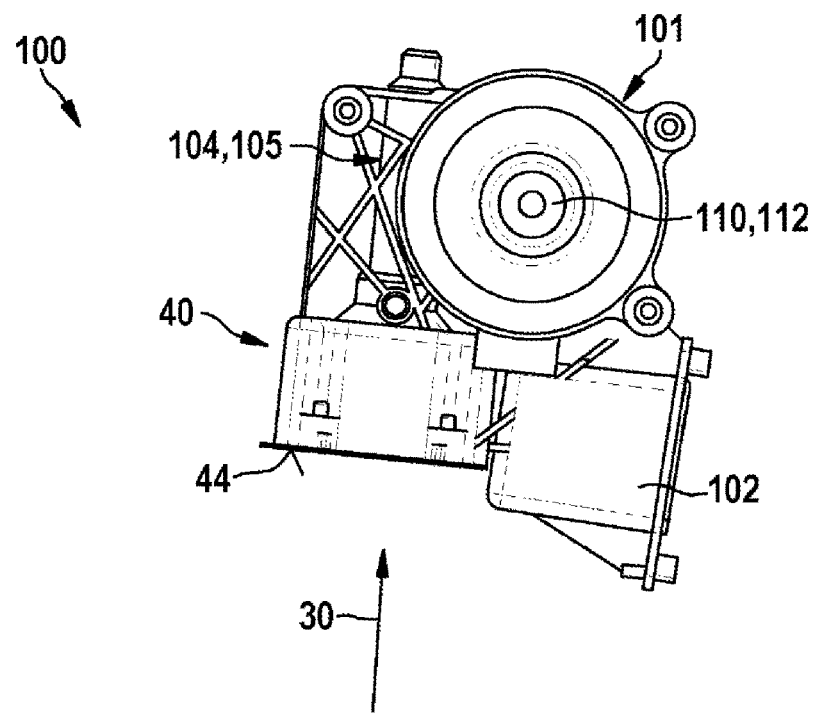
Figure 7:
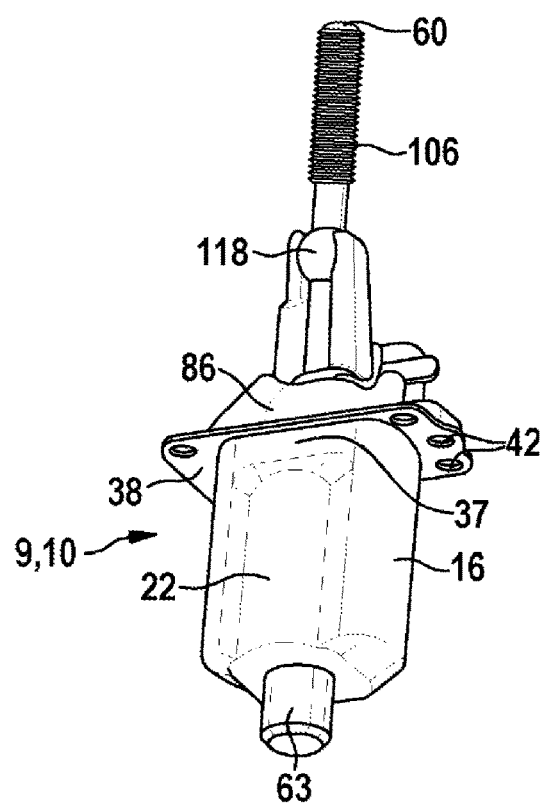

FIG. 7 shows a fully mounted gear mechanism/drive unit 100 which, as electrical machine 10, has an electric motor 9 with consequent poles 22, which electric motor is flange-connected in a housing part 40 which is in the form of a gear mechanism housing 101 in which a gear mechanism 104 is arranged. The gear mechanism 104 is in the form of, for example, a worm gear mechanism 105 in which the worm 106 which is arranged on the rotor shaft 60 of the electric motor 9 meshes with a worm wheel which is mounted in the gear mechanism housing 101. The drive torque of the electric motor 9 is passed by the worm wheel to an output drive element 110—in particular an output drive pinion 112—which drives, for example, the part—in particular in the motor vehicle—which is to be adjusted. The pole housing 16 of the electric motor 9 is produced from metal and serves as a magnetic return path. In the exemplary embodiment, the gear mechanism housing 101 is produced from plastic, in particular by means of an injection-molding process. The housing part 40 has an electronics housing 102 for accommodating an electronics unit and is in the form of an integral constituent part of the gear mechanism housing 101.

It should be noted that various possible combinations of the individual features with one another are possible with regard to the exemplary embodiments which are shown in the figures and described in the description. Therefore, it is possible, for example, for the specific forming of the three-dimensional magnet-retaining spring 11, in particular the transition sections 87 between the limbs 90, 91 and the clip 92, to be varied and matched to the geometric space conditions in the housing 16. In the process, it is possible, for example, for the axial length of the two limbs 90, 91 to also be of different lengths, or for the limbs 90, 91 to have a different angle in relation to the axial axis. Instead of the beads 28, the consequent pole contour can also be formed in a different way, wherein the clip 92 then radially inwardly bridges the two edge regions of the consequent pole contour. The electrical machine 10 is preferably used for actuating drives in the motor vehicle, for example for adjusting seat parts, window panes, sliding roofs and covers of openings, but is not restricted to applications of this kind.

What is claimed is:

1. An electrical machine (10), having a housing (16) in which at least two permanent magnets (18) are arranged, and having a rotor (14) that has an approximately cylindrical circumferential surface (15) and that is arranged in the housing (16), said permanent magnets (18) being fastened in the housing (16) by at least one magnet-retaining spring (11), wherein the housing (16) is fixed relative to an axis of rotation of the rotor (14) and radially surrounds the rotor (14), wherein the magnet-retaining spring (11) has a first limb (90) and a second limb (91), wherein the first limb (90) and the second limb (91) are connected to one another by a clip (92), wherein the clip (92) overlaps the rotor (14) in relation to a radial direction (31) but does not traverse a central point of the rotor (14), and the first limb (90) and the second limb (91) span a plane (88), wherein the clip (92) projects out of the plane (88), wherein the first limb (90) bears against a side face (99) of one of the permanent magnets (18), wherein the second limb (91) bears against a side face (99) of the other one of the permanent magnets (18), and wherein the side face (99) of the one of the permanent magnets (18) and the side face (99) of the other one of the permanent magnets (18) are situated opposite one another in relation to a circumferential direction (32) of the housing (16).

2. The electric machine (10) as claimed in claim 1, characterized in that the clip (92) is formed in a curved manner transverse to the plane (88).

3. The electric machine (10) as claimed in claim 1, characterized in that the clip (92) has a straight section (84) which is formed approximately parallel to the plane (88).

4. The electric machine (10) as claimed in claim 1, characterized in that the magnet-retaining spring (11) is an integral bent part which is composed of spring steel.

5. The electric machine (10) as claimed in claim 1, characterized in that the two limbs (90, 91) are formed approximately in a straight line and are arranged at an angle in relation to one another.

6. The electrical machine (10) as claimed in claim 1, characterized in that the housing (16) forms a magnetic return path, and the housing (16) has flattened regions (20) between the permanent magnets (18) which are magnetized in the same sense in the radial direction (31), a housing wall (26) forming mutually opposite magnetic consequent poles (22) on said regions, and each of the flattened regions (20) of the housing (16) having two beads (28) which run approximately parallel in an axial direction (30) and which form an inner contour of the consequent poles (22) and a transition to retaining regions (34) of the permanent magnets (18).

7. The electrical machine (10) as claimed in claim 6, characterized in that a hollow space (94) is formed between the side faces (99) of the permanent magnets (18) and the beads (28) in the circumferential direction (32), the limbs (90, 91) engaging radially into said hollow space and extending in the axial direction (30), and the clip (92) extends radially inward over the two beads (28) of a consequent pole (22) in the circumferential direction (32).

8. The electrical machine (10) as claimed in claim 1, characterized in that a housing base (82) is formed at an axial end of the housing (16), and the clip (92) is arranged axially between the rotor (14) and the housing base (82).

9. A method for producing an electrical machine (10) according to claim 1, comprising the following method steps:
    forming a metallic pole housing (16) by means of deep-drawing, wherein axial beads (28) and retaining regions (34), which adjoin said axial beads in a circumferential direction, for permanent magnets (18) are formed in order to form consequent poles (22),
    providing a rotor (14) with an approximately cylindrical circumferential surface (15), wherein the housing (16) is fixed relative to an axis of rotation of the rotor (14) and radially surrounds the rotor (14), inserting the permanent magnets (18) into the retaining regions (34), inserting magnet-retaining springs (11) in such a way that free ends (95) of the limbs (90, 91) bear against the side faces (99) of the permanent magnets (18) in the circumferential direction (32), and the clip (92) is formed radially inwardly from the plane (88) which is spanned by the two limbs (90, 91), and axially inserting the rotor (14) together with a brush holder component (86), which surrounds a rotor shaft (60), into the housing (16), wherein the clip (92) overlaps the rotor (14) in relation to a radial direction (31) but does not traverse a center point of the rotor (14).

10. The electric machine (10) as claimed in claim 1, characterized in that the clip (92) is formed in a curved manner transverse to the plane (88), and in the manner of an arc between the two limbs (90, 91).

11. The electric machine (10) as claimed in claim 10, characterized in that the clip (92) has a straight section (84) which is formed approximately parallel to the plane (88) and is arranged at a distance from said plane (88).

12. The electric machine (10) as claimed in claim 11, characterized in that the magnet-retaining spring (11) is produced as an integral bent part which is composed of stainless spring steel, wherein the limbs (90, 91) and the clip (92) have a round or a polygonal or an approximately polygonal cross section (13).

13. The electric machine (10) as claimed in claim 12, characterized in that the two limbs (90, 91) are formed approximately in a straight line and are arranged at an angle in relation to one another, said angle being 5° to 40°.

14. The electrical machine (10) as claimed in claim 1, wherein the machine is configured for motorized adjustment of moving parts in motor vehicles, and wherein the magnets are pressed against a housing inner wall (17) of the housing (16) by means of a spring force which is generated by the magnet-retaining spring (11).

15. The electrical machine (10) as claimed in claim 14, characterized in that the housing (16) forms a magnetic return path, and the housing (16) has flattened regions (20) between the permanent magnets (18) which are magnetized in the same sense in a radial direction (31), a housing wall (26) forming mutually opposite magnetic consequent poles (22) on said regions, and each of the flattened regions (20) of the housing (16) having two beads (28) which run approximately parallel in an axial direction (30) and which form an inner contour of the consequent poles (22) and a transition to retaining regions (34) of the permanent magnets (18), and the limbs (90, 91) are arranged between the beads (28) and the permanent magnets (18) in relation to the circumferential direction (32).

16. The electrical machine (10) as claimed in claim 15, characterized in that a hollow space (94) is formed between the side faces (99) of the permanent magnets (18) and the beads (28) in the circumferential direction (32), the limbs (90, 91) engaging radially into said hollow space and extending in the axial direction (30), and the clip (92) extends radially inward over the two beads (28) of a consequent pole (22) in the circumferential direction (32), wherein, transition regions (87) between the limbs (90, 91) and the clip (92) have a radial component (96) which points radially inward away from the hollow space (94).

17. The electrical machine (10) as claimed in claim 16, characterized in that a rotor (14) which receives windings (64) having an approximately cylindrical circumferential surface (15) is arranged in the housing (16), and the clip (92) overlaps the rotor (14) in relation to the radial direction (31) and is arranged at least partially radially within the circumferential surface (15).

18. The electrical machine (10) as claimed in claim 17, characterized in that a housing base (82) is formed at an axial end of the housing (16) integrally with said housing, and the clip (92) is arranged axially between the rotor (14) and the housing base (82), and bears axially against the housing base (82).

19. A method for producing an electrical machine (10) according to claim 1, wherein the machine is an electric drive in motor vehicles, the method comprising the following method steps:

forming a metallic pole housing (16) by means of deep-drawing, wherein axial beads (28) and retaining regions (34), which adjoin said axial beads in a circumferential direction, for permanent magnets (18) are formed in order to form consequent poles (22), inserting the permanent magnets (18) into the retaining regions (34), wherein the permanent magnets (18) are magnetized in the same sense in relation to the radial direction (31), inserting magnet-retaining springs (11) in such a way that free ends (95) of the limbs (90, 91) bear against the side faces (99) of the permanent magnets (18) in the circumferential direction (32), and the clip (92) is formed radially inwardly from the plane (88) which is spanned by the two limbs (90, 91), and axially inserting the rotor (14) together with a brush holder component (86), which surrounds a rotor shaft (60), into the housing (16), wherein a gear mechanism housing part (101) is then axially joined to the brush holder component (86), and is fastened to a flange (38) of the housing (16) by way of a mating flange (44).

20. The method for producing an electrical machine (10) according to claim 19, wherein the permanent magnets (18) are inserted into the retaining regions (34) using adhesive.

21. The electrical machine according to claim 1, wherein the clip (92) is arranged at least partially radially inward the circumferential surface (15).

22. The electrical machine according to claim 1, wherein the at least two permanent magnets (18) are pressed against a housing inner wall (17) of the housing (16) by means of a spring force which is generated by the at least one magnet-retaining spring (11).

23. The electrical machine according to claim 1, wherein the rotor (14) receives electrical windings (64).

* * * * *